US009263788B2

(12) United States Patent
Ayatollahi

(10) Patent No.: US 9,263,788 B2
(45) Date of Patent: Feb. 16, 2016

(54) MOBILE DEVICE HAVING RECONFIGURABLE ANTENNA AND ASSOCIATED METHODS

(75) Inventor: Mina Ayatollahi, Waterloo (CA)

(73) Assignee: BLACKBERRY LIMITED, Ontario (CA)

( * ) Notice: Subject to any disclaimer, the term of this patent is extended or adjusted under 35 U.S.C. 154(b) by 1011 days.

(21) Appl. No.: 13/227,968

(22) Filed: Sep. 8, 2011

(65) Prior Publication Data

US 2013/0065543 A1 Mar. 14, 2013

(51) Int. Cl.

| | |
|---|---|
| ***H04B 1/44*** | (2006.01) |
| ***H01Q 1/24*** | (2006.01) |
| ***H01Q 7/00*** | (2006.01) |
| ***H01Q 9/14*** | (2006.01) |

(52) U.S. Cl.

CPC ................ *H01Q 1/243* (2013.01); *H01Q 7/00* (2013.01); *H01Q 9/145* (2013.01)

(58) Field of Classification Search

USPC .................. 455/78, 90.2, 90.3, 418; 343/876

See application file for complete search history.

(56) References Cited

U.S. PATENT DOCUMENTS

| | | | | |
|---|---|---|---|---|
| 5,294,939 | A | 3/1994 | Sanford et al. | 343/836 |
| 7,119,744 | B2 | 10/2006 | Theobold et al. | 343/700 |
| 7,551,146 | B2 | 6/2009 | Pan et al. | 343/876 |
| 7,561,109 | B2 | 7/2009 | Walton et al. | 343/700 |
| 7,834,813 | B2 | 11/2010 | Caimi et al. | 343/745 |
| 2009/0081965 | A1 | 3/2009 | Erceg et al. | 455/90.2 |
| 2009/0156191 | A1 | 6/2009 | Hassan et al. | 455/418 |
| 2009/0251383 | A1 * | 10/2009 | Tani et al. | 343/852 |
| 2010/0039235 | A1 | 2/2010 | Nagai | |
| 2010/0052988 | A1 | 3/2010 | Chou et al. | |

FOREIGN PATENT DOCUMENTS

| | | |
|---|---|---|
| JP | 2000269724 | 9/2000 |
| JP | 2001326514 | 11/2001 |
| JP | 2008278414 | 11/2008 |
| JP | 2008294748 | 12/2008 |

OTHER PUBLICATIONS

Cetiner et al., "A MIMO System With Multifunctional Reconfigurable Antennas", *IEEE A WPL*, Dec. 2006, pp. 1-4.

* cited by examiner

*Primary Examiner* — Hsin-Chun Liao

(74) *Attorney, Agent, or Firm* — Guntin & Gust, PLC; Ralph Trementozzi

(57) ABSTRACT

A mobile wireless communications device includes a wireless transceiver, and a reconfigurable antenna coupled to the wireless transceiver. The reconfigurable antenna has a dielectric substrate, with a plurality of electrical conductors on the dielectric substrate laterally adjacent the ground plane and arranged in a series of spaced apart antenna loops with each successive outer antenna loop surrounding an adjacent inner loop, each antenna loop having a pair of endpoints. A plurality of switches are associated with respective endpoints of the antenna loops. A processor is adapted to reconfigure the reconfigurable antenna and couple the wireless transceiver thereto via the plurality of switches.

23 Claims, 14 Drawing Sheets

MOBILE DEVICE HAVING RECONFIGURABLE ANTENNA AND ASSOCIATED METHODS

TECHNICAL FIELD

The present disclosure related to the field of mobile wireless communications devices, and, more particularly, to mobile wireless communications devices with reconfigurable antennas.

BACKGROUND

Wireless communication technology, which has become a fundamental part of modern communications infrastructures, is evolving at an ever growing pace in order to meet the demanding performance characteristics of new mobile wireless communication devices. The continued increase in demand for various wireless services such as voice, data, and multimedia is also fueling the desire for higher data rates. Given that the wireless bandwidth can be expensive, technologies that improve spectrum efficiency in wireless systems are becoming desirable.

Multiple-input multiple-output (MIMO) systems can multiply data throughput, with increases also in range and reliability, without consuming extra bandwidth, thereby resulting in an improved spectral efficiency. To take full advantage of the benefits of MIMO systems, however, a design that is able to respond to the wireless channel is useful. The goal is to maximize the resources available in multiple antenna channels by using optimal schemes at all possible times.

In a typical adaptive MIMO system, some of the adjustable parameters are the modulation level, coding rate, and the transmission signaling schemes such. The performance of such an adaptive system can be superior compared to that of a non-adaptive one. However, when an inter-disciplinary analysis is performed on the interrelationships of transmission signaling schemes, antenna properties and propagation conditions, it becomes apparent that there is an additional room for further exploitation of gains of the MIMO systems. In current adaptive MIMO systems the antenna properties are fixed by the initial design and cannot be changed. It is therefore desirable to introduce an additional degree of freedom by to adaptive MIMO systems treating the antenna element properties as an additional component in the joint optimization of the adaptive system parameters. Therefore, the design of reconfigurable antennas for MIMO systems is desirable.

One use for reconfigurable antennas is in cognitive radio systems. Cognitive radio is a system in which either a network or a wireless node changes its transmission or reception parameters to communicate efficiently while avoiding interference with other users. This alteration of parameters is based on the active monitoring of several factors in the external and internal radio environment, such as radio frequency spectrum, user behavior and network state. Since the operating frequency of the a mobile wireless communications device changes frequently in cognitive radio based on detected empty spectrum, adaptive and reconfigurable antennas for these systems that are able to change their resonance frequency dynamically are desirable.

BRIEF DESCRIPTION OF THE DRAWINGS

For a better understanding of the various embodiments described herein and to show more clearly how they may be carried into effect, reference will now be made, by way of example only, to the accompanying drawings which show example embodiment and in which.

DETAILED DESCRIPTION

Figure 1:
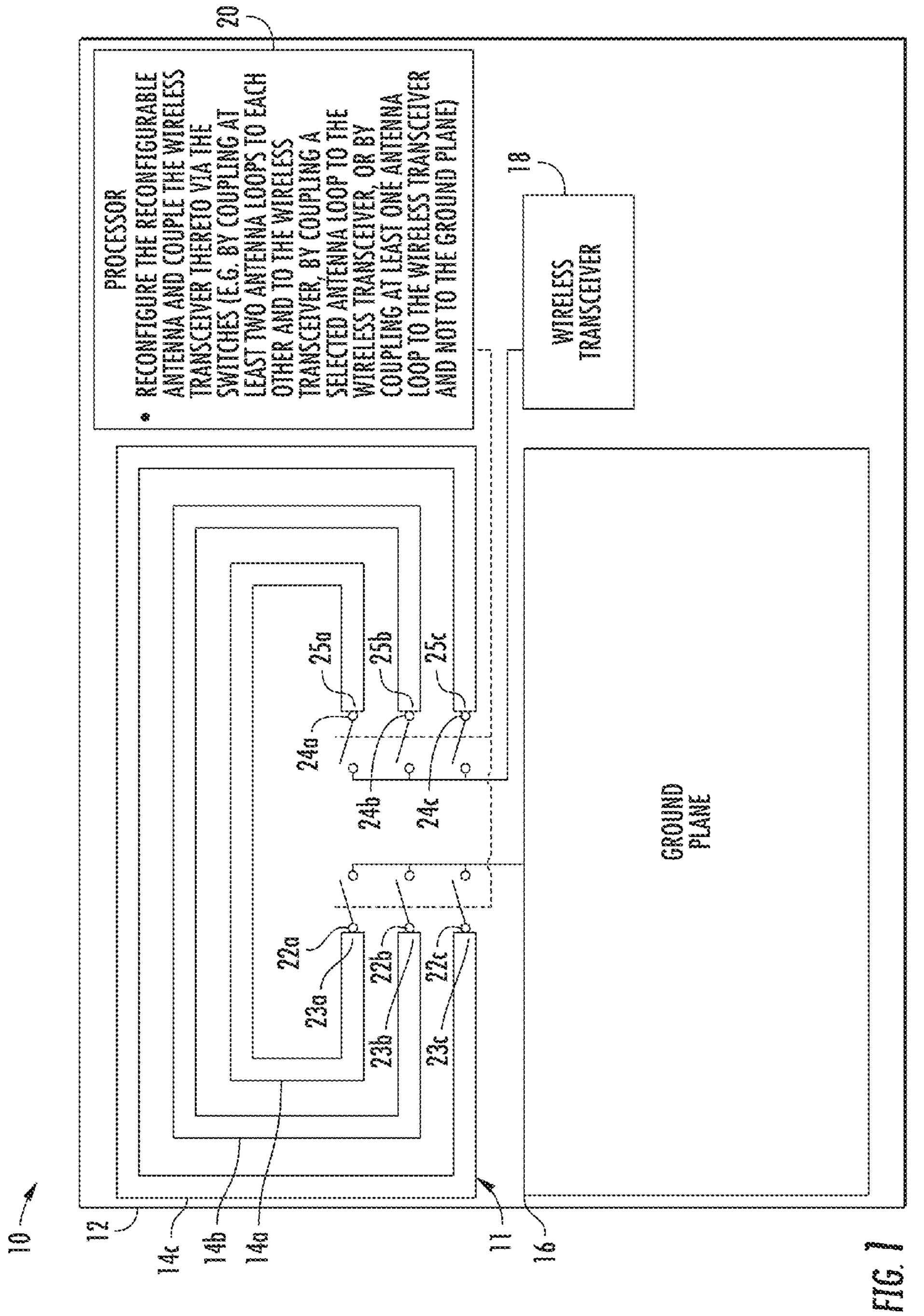
FIG. 1 is schematic block diagram of an example embodiment of a mobile wireless communications device in accordance with the present disclosure.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Generally speaking, a mobile wireless communications device may include a wireless transceiver, and a reconfigurable antenna coupled to the wireless transceiver. The reconfigurable antenna may include a dielectric substrate. The reconfigurable antenna may further comprise a plurality of electrical conductors on the dielectric substrate arranged in a nested series of spaced apart antenna loops with each successive outer antenna loop surrounding an adjacent inner loop, and each antenna loop having a pair of endpoints. A plurality of switches may be associated with respective endpoints of the antenna loops. In addition, a processor may be adapted to reconfigure the reconfigurable antenna and couple the wireless transceiver thereto via the plurality of switches. This system advantageously allows reconfiguring of the antenna so as to provide optimal performance in a variety of operating conditions. The performance is evaluated by parameters including, but not limited to operating frequency, specific absorption rate, gain, efficiency, and bandwidth.

The reconfigurable antenna may also include an electrically conductive layer on the dielectric substrate defining a ground plane. In this embodiment, the plurality of electrical conductors may be laterally adjacent the ground plane. The processor may be adapted to reconfigure the reconfigurable antenna by causing the plurality of switches to couple at least one of the antenna loops to the wireless transceiver and not to the ground plane.

Additionally or alternatively, the mobile wireless communications device may have a printed circuit board having an electrically conductive layer thereon defining a ground plane. In this embodiment, the processor may be adapted to reconfigure the reconfigurable antenna and couple the wireless transceiver and the ground plane thereto via the plurality of switches. The processor may be adapted to reconfigure the reconfigurable antenna by causing the plurality of switches to couple at least one of the antenna loops to the wireless transceiver and not to the ground plane.

The plurality of switches may include a respective feed switch coupled to a respective feed endpoint of each antenna loop. Additionally or alternatively, the plurality of switches may include a respective ground switch coupled to a respective ground endpoint of each antenna loop.

The processor may be adapted to reconfigure the reconfigurable antenna by coupling at least two antenna loops to each other and to the wireless transceiver. The processor may also be adapted to reconfigure the reconfigurable antenna by causing the plurality of switches to couple a selected one of the antenna loops to the wireless transceiver, while disconnecting or decoupling the other antenna loops from the transceiver.

The antenna loops may be equally spaced apart from each other. In addition, the antenna loops may share a common axis. Furthermore, each of the antenna loops may have a rectangular shape. Moreover, the antenna loops may be at least three in number. Each successive outer antenna loop may have a greater length than an adjacent inner loop. At least one of the antenna loops may have a rectangular shape with at least one electrically conductive path extending between a pair of transverse sides thereof.

A method aspect is directed to a method of making a mobile wireless communications device with a reconfigurable antenna. The method may include forming the reconfigurable antenna by forming a plurality of electrical conductors on a dielectric substrate and arranged in a nested series of spaced apart antenna loops with each successive outer antenna loop surrounding an adjacent inner loop, each antenna loop having a pair of endpoints, for example a feed endpoint and a ground endpoint. A plurality of switches may be associated with respective endpoints of the antenna loops. The method may further include adapting a processor to reconfigure the reconfigurable antenna and to couple a wireless transceiver thereto via the plurality of switches.

With initial reference to FIG. 1, a mobile wireless communications device 10 is now described. The mobile wireless communications device 10 includes a wireless transceiver 18 and a processor 20 coupled thereto. A reconfigurable antenna 11 is coupled to the wireless transceiver 18 and processor 20. The reconfigurable antenna 11 includes a dielectric substrate 12 with an electrically conductive ground patch formed thereon to define a ground plane 16. A plurality of electrical conductors are on the dielectric substrate laterally adjacent the ground plane 16, and are and arranged in a series of spaced apart antenna loops 14*a*, 14*b*, 14*c*, with each successive outer antenna loop surrounding an adjacent inner loop.

Figure 2:
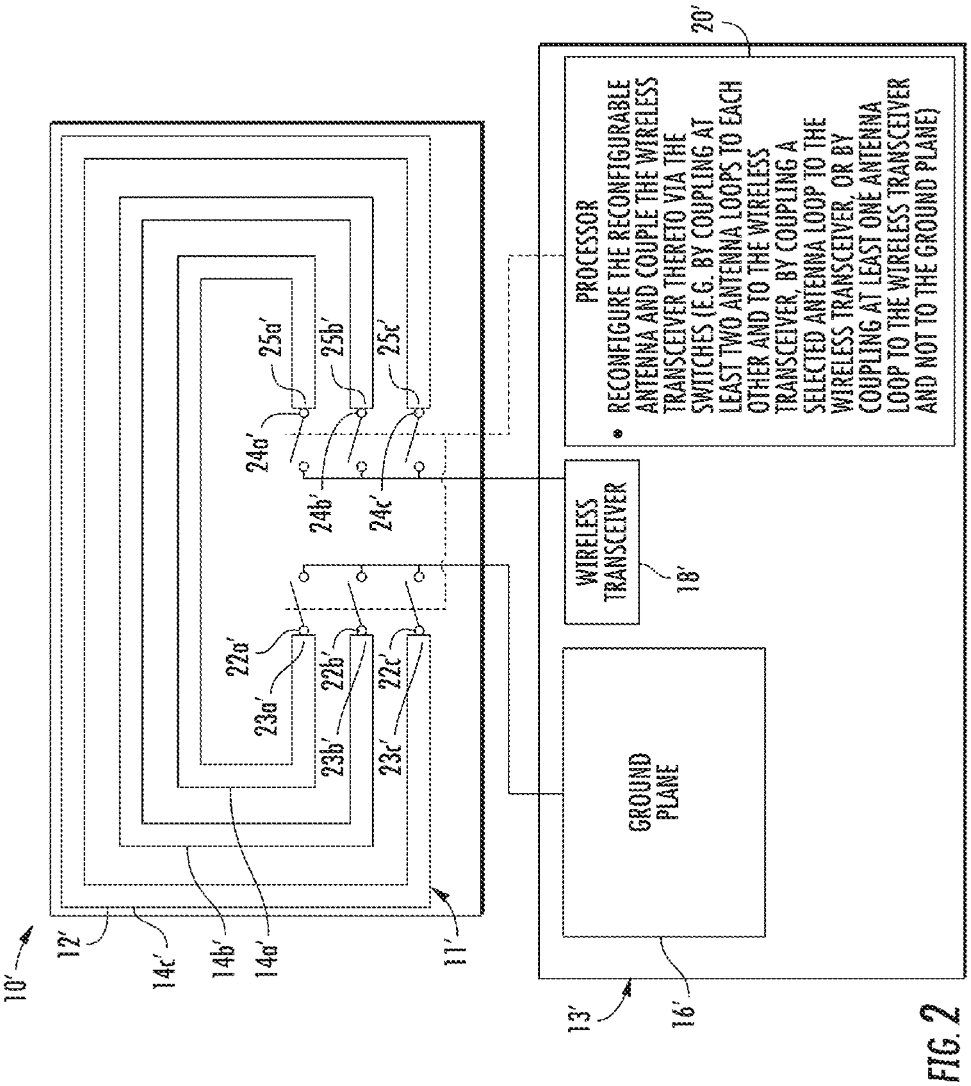
FIG. 2 is a schematic block diagram of another example embodiment of a mobile wireless communications device in accordance with the present disclosure.

Those of skill in the art will appreciate that the electrical conductors need not be on the dielectric substrate laterally adjacent the ground plane 16. For example, as shown in FIG. 2, the reconfigurable antenna 11' may be on a dielectric substrate, and the ground plane 16', wireless transceiver 18', and processor 20' may be on a separate printed circuit board 13'.

Referring again to FIG. 1, a plurality of switches 22*a*, 24*a*, 22*b*, 24*b*, 22*c*, 24*c* are associated with respective endpoints 23*a*, 23*b*, 23*c*, 25*a*, 25*b*, 25*c* of the antenna loops 14*a*, 14*b*, 14*c*. The processor 20 is adapted to reconfigure the reconfigurable antenna 11 and to couple the wireless transceiver 18 thereto via the switches 22*a*, 24*a*, 22*b*, 24*b*, 22*c*, 24*c*.

The switches include a respective feed switch 24*a*, 24*b*, 24*c* coupled to a respective endpoint 25*a*, 25*b*, 25*c* of each antenna loop 14*a*, 14*b*, 14*c*. The feed switches 24*a*, 24*b*, 24*c* selectively couple their respective antenna loops 14*a*, 14*b*, 14*c* to the wireless transceiver 18.

The switches also include a respective ground switch 22*a*, 22*b*, 22*c* coupled to a respective endpoint 23*a*, 23*b*, 23*c* of each antenna loop 14*a*, 14*b*, 14*c*. The ground switches 22*a*, 22*b*, 22*c* selectively couple their respective antenna loops 14*a*, 14*b*, 14*c* to the ground plane 16.

Figure 5:
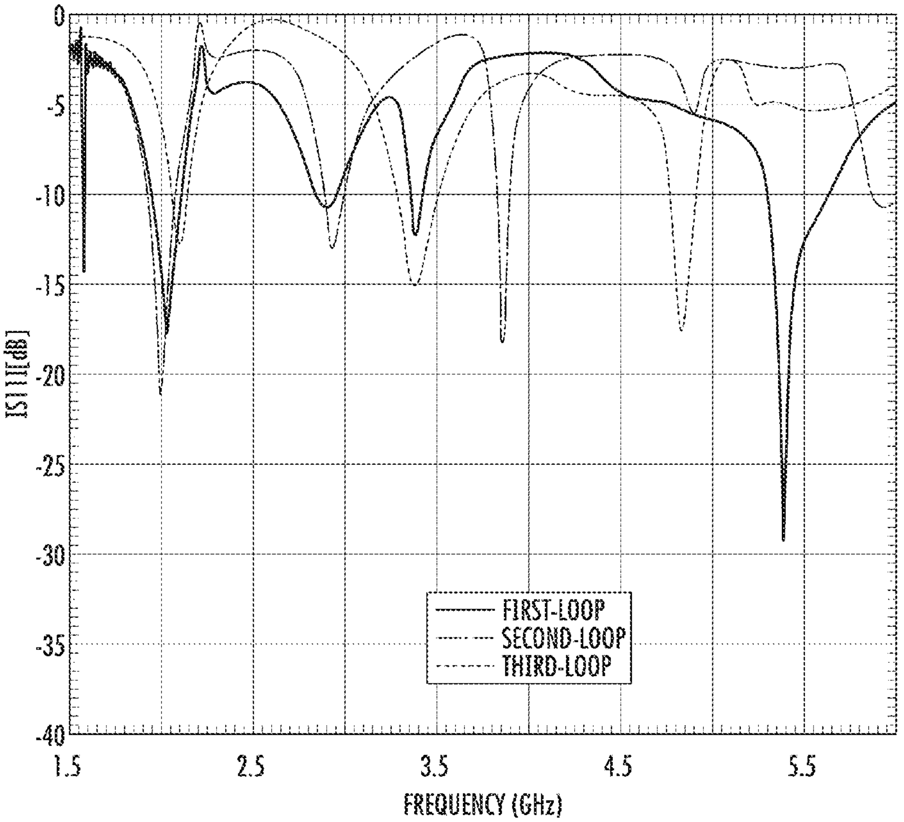
FIG. 5 shows S-parameter plots of each antenna loop, in turn, radiating while being coupled between the wireless transceiver and ground.
Figure 10:
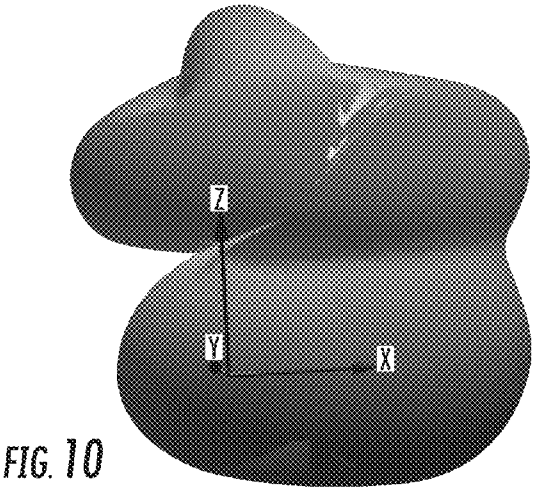
FIG. 10 shows a three dimensional radiation pattern of the first antenna loop of the reconfigurable antenna radiating while coupled to the wireless transceiver and ground.

The processor 20 may reconfigure the reconfigurable antenna 11 to match operating conditions and a system operating frequency, by operating the proper switches to couple a selected one of the antenna loops to the wireless transceiver 18 and the ground plane 16. Each antenna loop 14*a*, 14*b*, 14*c*, when coupled to the wireless transceiver 18 and the ground plane 16, with the other antenna loops disconnected, resonates at its resonance frequencies, which include a one wavelength mode. The processor 20, based upon the system operating frequency, can select the antenna loop 14*a*, 14*b*, 14*c* that has a resonance frequency that matches the system operating frequency, thereby delivering robust performance. An S-parameter plot of each antenna loop 14*a*, 14*b*, 14*c* radiating while coupled between the wireless transceiver 18 and the ground plane 16, is shown in FIG. 5 (in FIG. 5, the first loop, second loop and third loop correspond to antenna loop 14*c*, 14*b* and 14*a*, respectively.) A three dimensional radiation pattern of the antenna loop 14$c$ radiating while coupled between the wireless transceiver 18 and the ground plane 16 is shown in FIG. 10.

Figure 9:
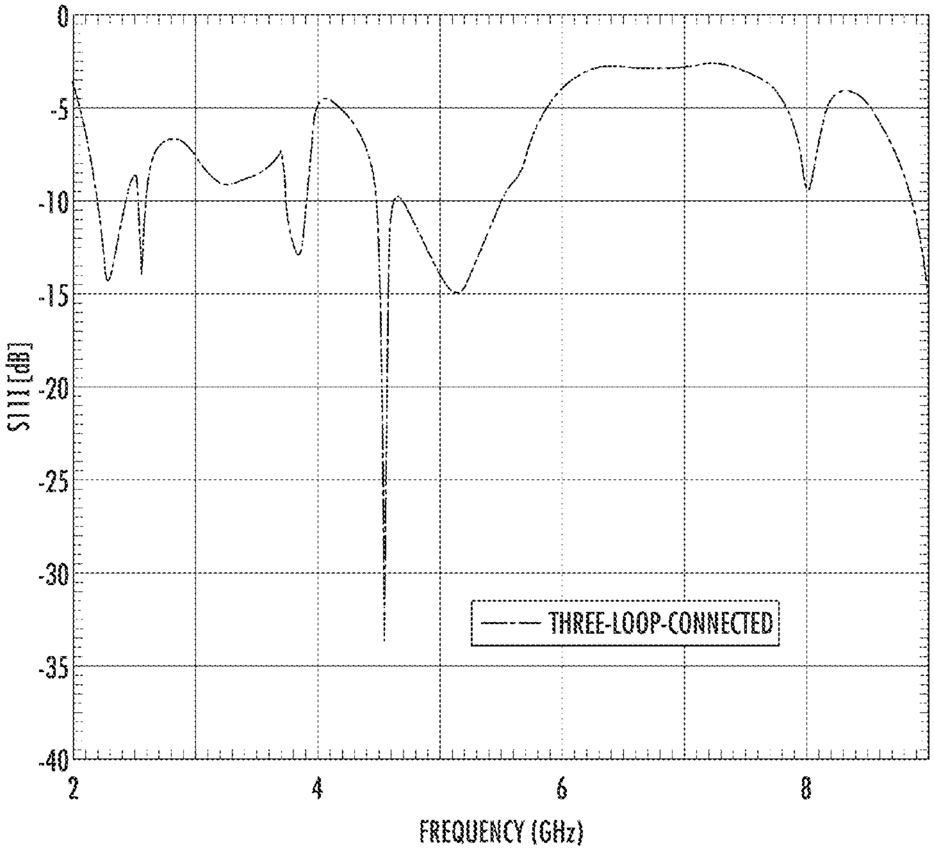
FIG. 9 shows an S-parameter plot of the reconfigurable antenna radiating when all antenna loops are coupled between the wireless transceiver and ground.

Additionally, in some application, the processor 20 may also reconfigure the reconfigurable antenna 11 by coupling or connecting at least two of the antenna loops 14$a$, 14$b$, 14$c$ to each other, either in series or in parallel. FIG. 9 shows an S-parameter plot of each antenna loop 14$a$, 14$b$, 14$c$ radiating, while their switches 22$a$, 22$b$, 22$c$, 24$a$, 24$b$, 24$c$ are closed and the loops are connected to each other, with their respective feed endpoints 25$a$, 25$b$, 25$c$ coupled to the wireless transceiver 18, and their respective ground endpoints 23$a$, 23$b$, 23$c$ coupled to the ground plane 16.

Furthermore, in some applications, the processor 20 may reconfigure the reconfigurable antenna 11 by coupling at least one of the antenna loops 14$a$, 14$b$, 14$c$ to the wireless transceiver 18, and decoupling the at least one antenna loop from the ground plane 16, thereby causing the reconfigurable antenna 11 to act as a monopole antenna. This is particularly advantageous because it enables reconfiguration of the reconfigurable antenna 11 as either a loop antenna or a monopole antenna, each having different features and characteristics.

Figure 4:
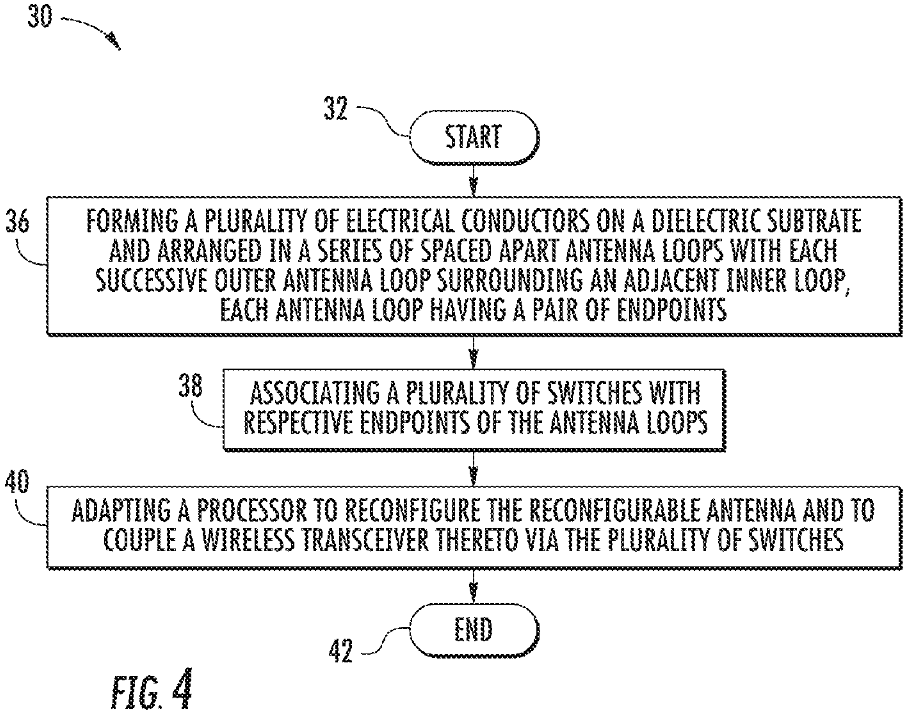
FIG. 4 is a flowchart of a method of making a mobile wireless communications device in accordance with the present disclosure.
Figure 6:
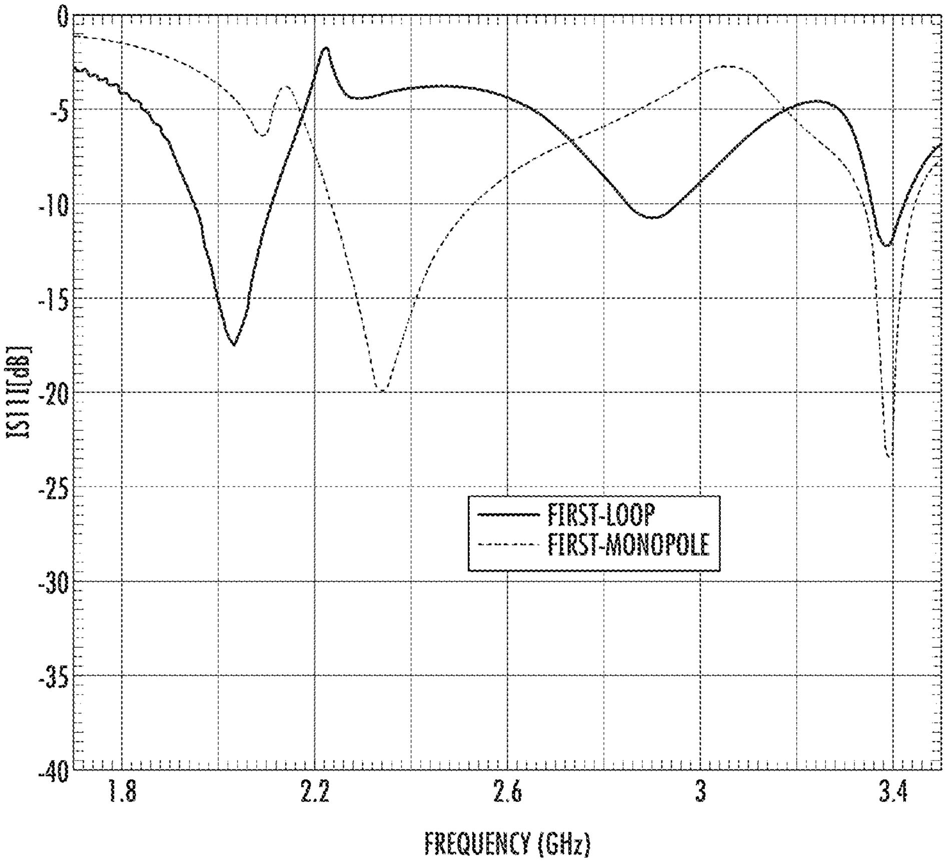
FIG. 6 shows an S-parameter plot of the first antenna loop radiating while being coupled between the wireless transceiver and ground, and also while operating as a monopole antenna.
Figure 7:
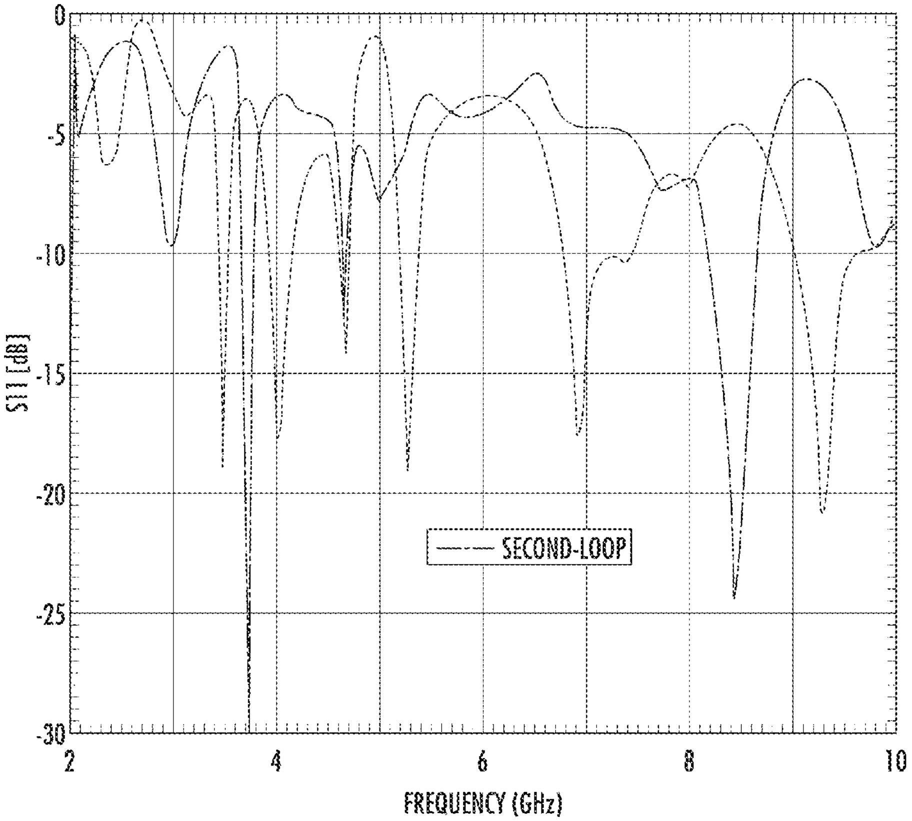
FIG. 7 shows an S-parameter plot of the second antenna loop radiating while being coupled between the wireless transceiver and ground, and also while operating as a monopole antenna.
Figure 8:
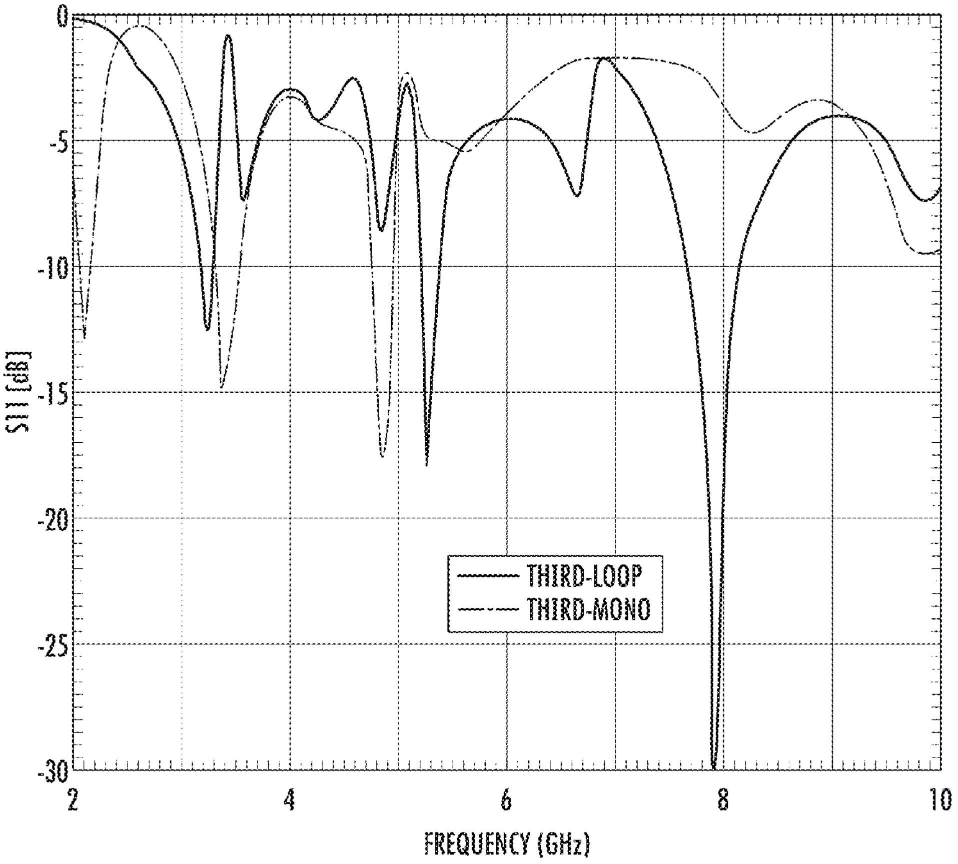
FIG. 8 shows an S-parameter plot of the first antenna loop radiating while being coupled between the wireless transceiver and ground, and also while operating as a monopole antenna.
Figure 11:
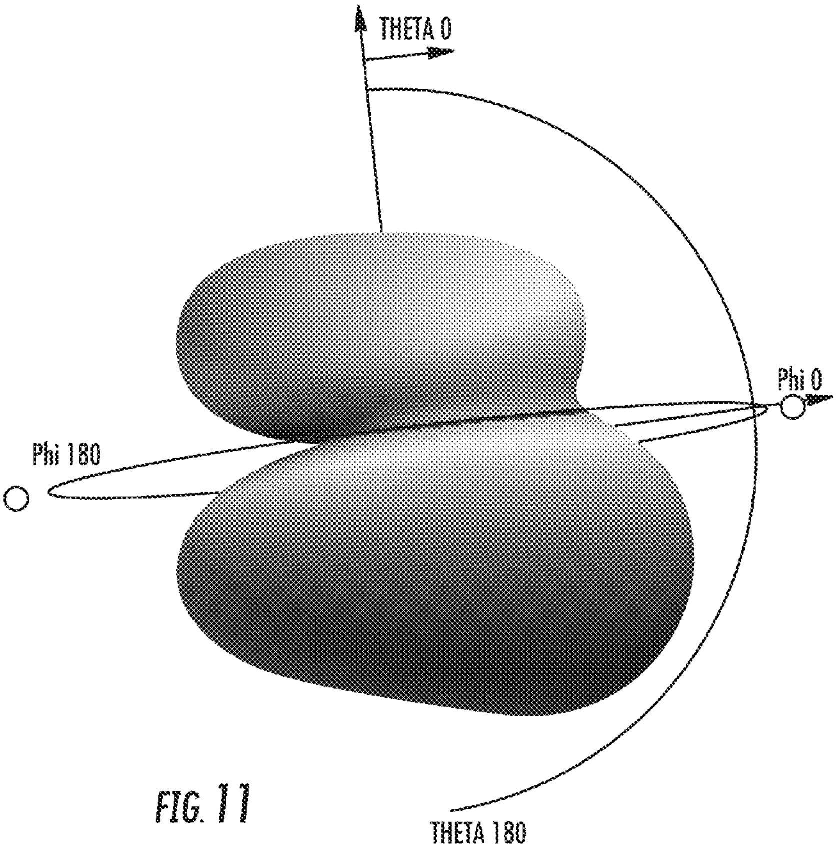
FIG. 11 shows a three dimensional radiation pattern of the first antenna loop of the reconfigurable antenna radiating while coupled to the wireless transceiver and operating as a monopole antenna.
Figure 12:
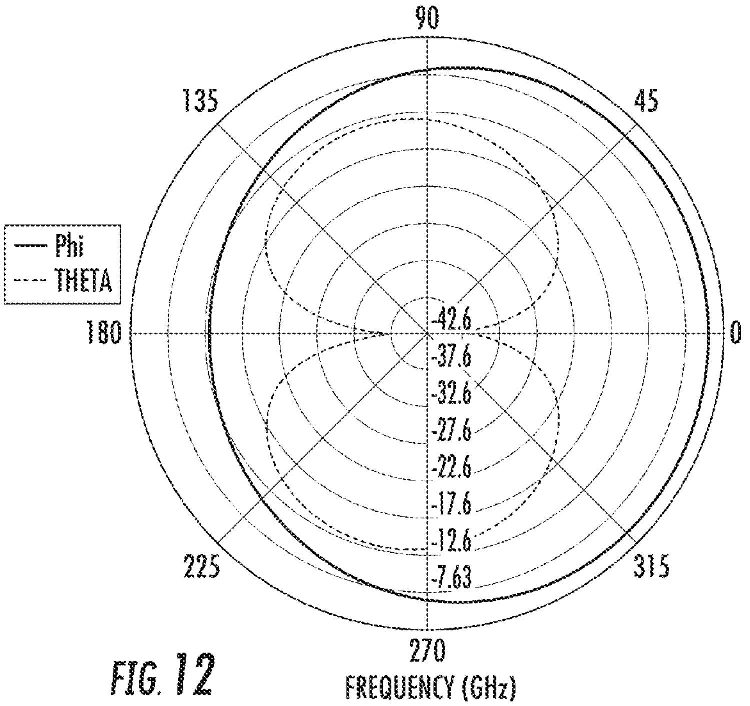
FIG. 12 shows a two dimensional radiation pattern of the first antenna loop of the reconfigurable antenna in the XY plane radiating while coupled to the wireless transceiver and operating as a monopole antenna.
Figure 13:
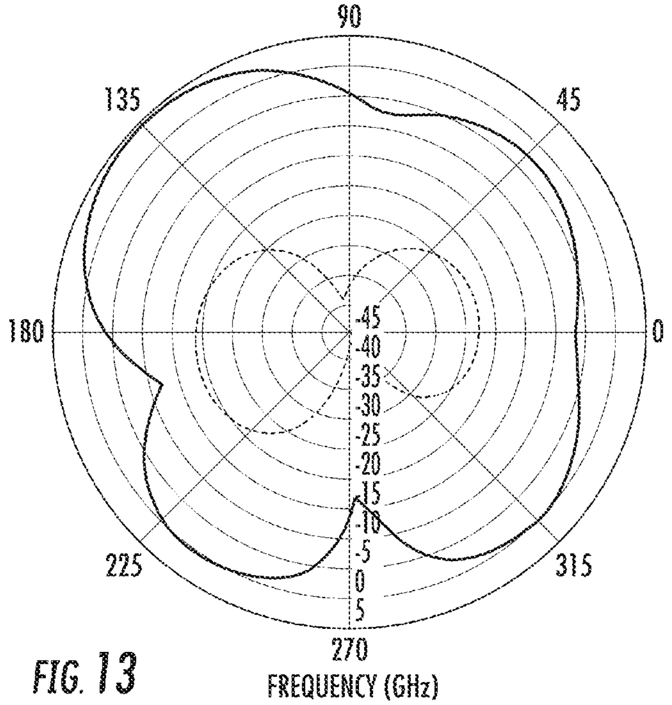
FIG. 13 shows a two dimensional radiation pattern of the first antenna loop of the reconfigurable antenna in the XZ plane radiating while coupled to the wireless transceiver and operating as a monopole antenna.
Figure 14:
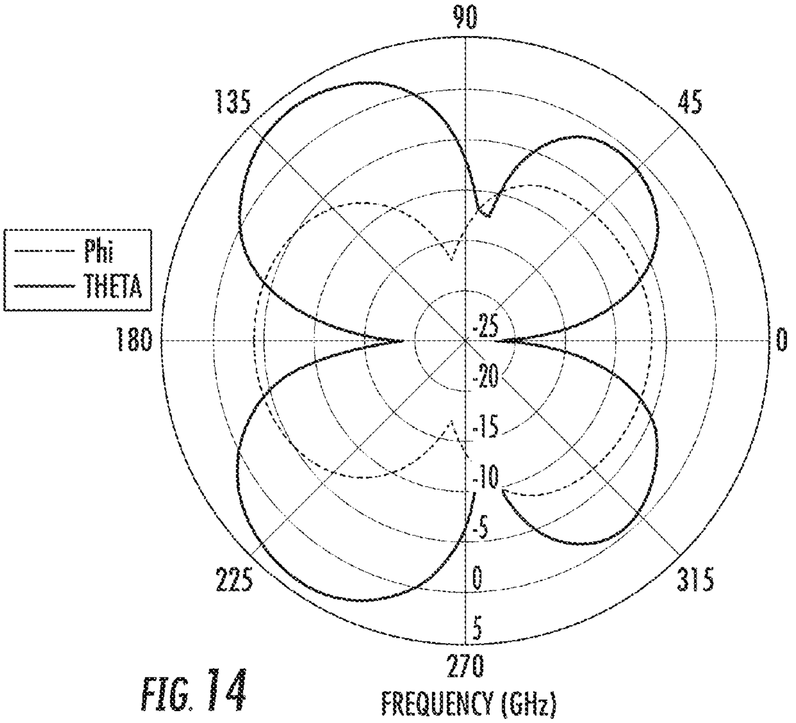
FIG. 14 shows a two dimensional radiation pattern of the first antenna loop of the reconfigurable antenna in the YZ plane radiating while coupled to the wireless transceiver and operating as a monopole antenna.

FIGS. 4-6 show S-parameter plots of the first antenna loop 14$c$, second antenna loop 14$b$, and third antenna loop 14$a$, respectively, radiating while coupled between to wireless transceiver 18 and while acting as a monopole antenna. FIG. 11 shows a three dimensional radiation pattern of the first antenna loop 14$c$ radiating while coupled to the wireless transceiver 18, acting as a monopole antenna. FIG. 12, FIG. 13, and FIG. 13 show two dimension radiation patterns of the first antenna loop 14$c$ radiating while coupled to the wireless transceiver 18, acting as a monopole antenna, in the XI, XZ, and YZ planes, respectively.

The antenna loops 14$a$, 14$b$, 14$c$ are illustratively equally spaced apart from each other, although it should be appreciated that they need not be equally spaced apart from each other. For example, none of the antenna loops 14$a$, 14$b$, 14$c$ may be equally spaced apart from each other, or some but not all of the antenna loops may be equally spaced apart from each other.

The antenna loops 14$a$, 14$b$, 14$c$ illustratively share a common axis, but it should be recognized that they need not share a common axis. Indeed, none of the antenna loops 14$a$, 14$b$, 14$c$ may share a common axis, or some but not all of the antenna loops may share a common axis.

Each of the antenna loops 14$a$, 14$b$, 14$c$ illustratively has a rectangular shape. Those of skill in the art will recognize, though, that the antenna loops 14$a$, 14$b$, 14$c$ need not have a rectangular shape, and each of the antenna loops may have different shapes, such as spirals, curves, and meanders. Each antenna loop 14$a$, 14$b$, 14$c$ need not have a same shape, and, indeed, each antenna loop may have a separate and distinct shape from each other antenna loop in some applications.

Each successive outer antenna loop 14$b$, 14$c$ illustratively has a greater length than an adjacent inner loop 14$a$, 14$b$. It should be appreciated that all outer antenna loops 14$b$, 14$c$ need not have greater lengths than their adjacent inner loops 14$a$, 14$b$ in all embodiments, and that in some embodiments, some inner loops may actually have greater lengths than their adjacent outer loops.

Three antenna loops 14$a$, 14$b$, 14$c$ are illustratively shown, but it should be appreciated that there may be as few as two antenna loops, and that there is no upper limit on the number of antenna loops that may be on the dielectric substrate 12.

The dielectric substrate 12 may have a length of 100 mm, a width of 4 mm, and a permittivity of 2.2. The ground plane 16 may have a length of 80 mm, and a width of 40 mm. The innermost antenna loop 14$a$ may have a total length of 64 mm, the middle antenna loop 14$b$ may have a total length of 80 mm, and the outer antenna loop 14$c$ may have a total length of 106 mm. It should be appreciated that these measurements are merely illustrative, and are in no way intended to be limiting. Thus, the dielectric substrate 12, ground plane 16, and antenna loops 14$a$, 14$b$, 14$c$ may have a variety of different suitable dimensions.

Figure 3:
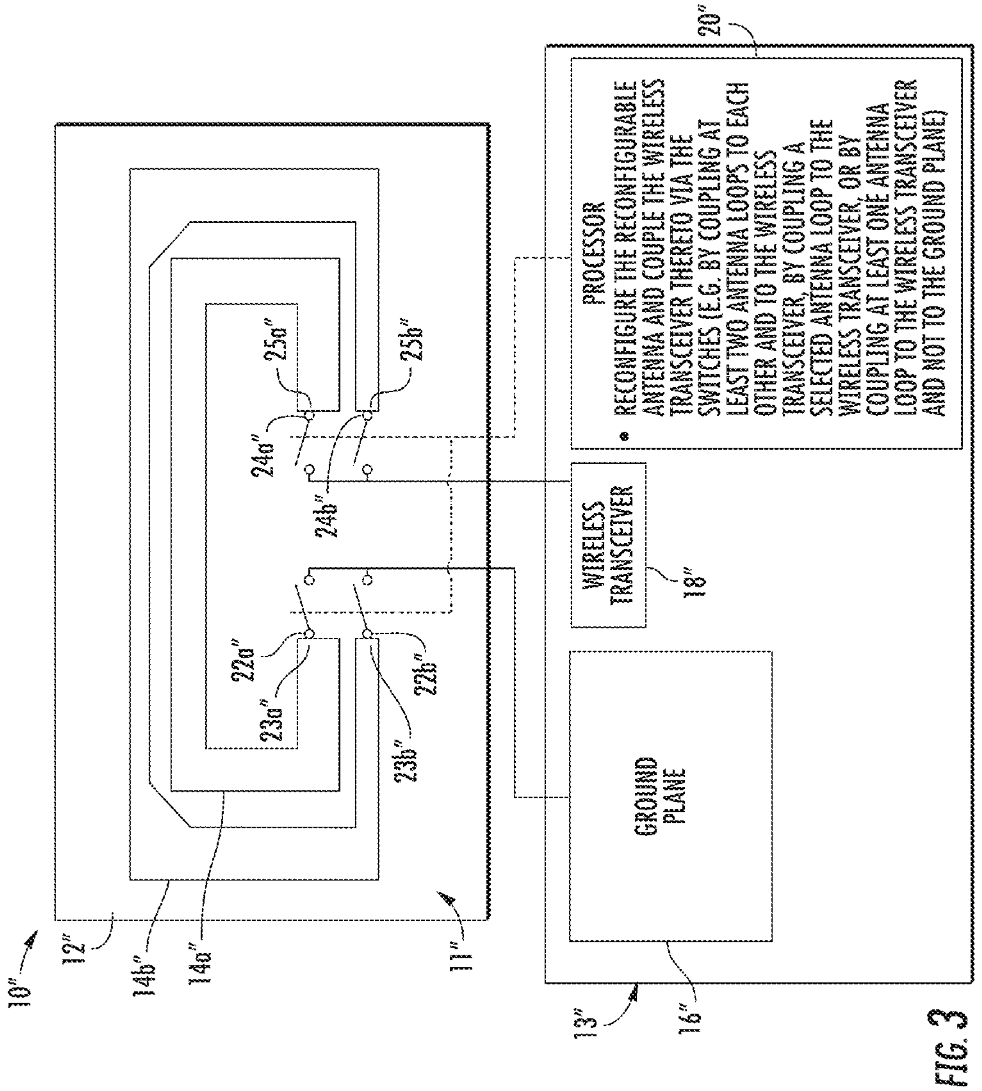
FIG. 3 is a schematic block diagram of a further embodiment of a mobile wireless communications device in accordance with the present disclosure.
Figure 15:
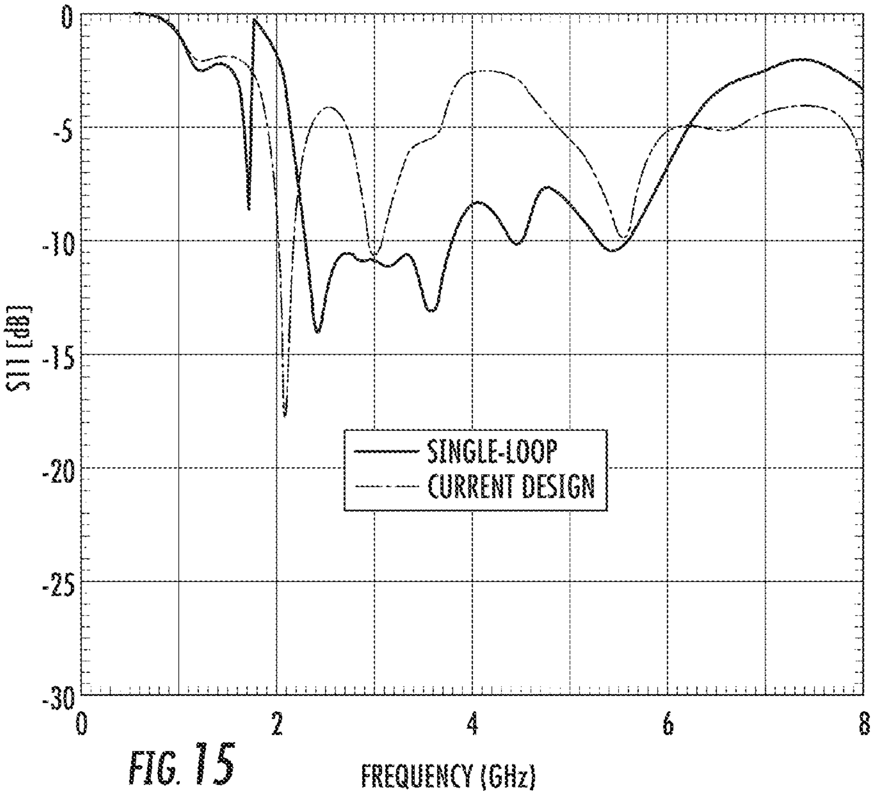
FIG. 15 shows an S-parameter plot of the first antenna loop of the reconfigurable antenna of FIG. 3 alone, and the first and second antenna loops both coupled to the wireless transceiver and the ground plane.
Figure 16:
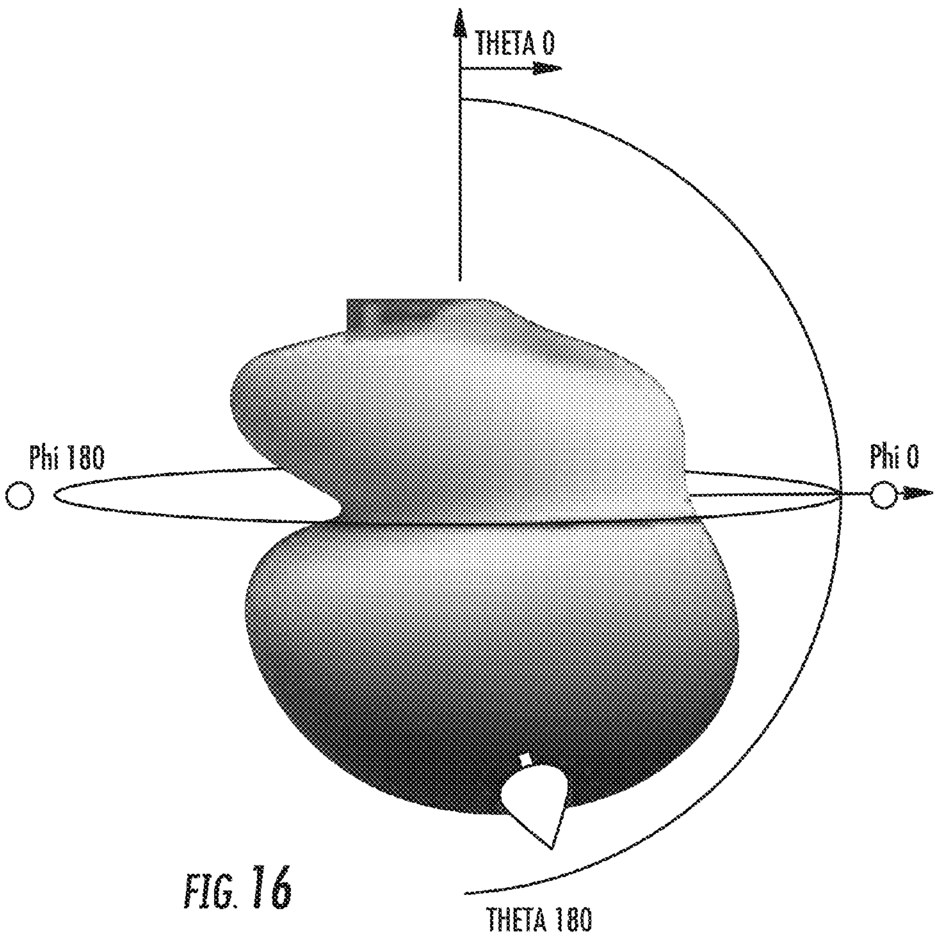
FIG. 16 shows a three dimensional radiation pattern of the antenna structure of FIG. 3, while the first and second antenna loops are coupled to the wireless transceiver and the ground plane.

In some situations, the antenna loops may be rectangular but have angled shoulders. Such an embodiment is shown in FIG. 3. Here, there are two antenna loops 14$a$", 14$b$". The antenna loop 14$a$" is rectangular in shape, with the ends being thicker than the sides. The antenna loop 14$b$" is rectangular, but with conductive patches or shoulders extending between transverse sides. FIG. 15 shows an S-parameter plot of the antenna loop 14$a$" alone coupled between the wireless transceiver 18" and the ground plane 16" (dashed line) versus the antenna loops 14$a$", 14$b$" both coupled between the wireless transceiver 18" and the ground plane 16". A three dimensional antenna radiation pattern of the antenna loops 14$a$", 14$b$" both coupled between the wireless transceiver 18" and the ground plane 16" is shown in FIG. 16.

Referring again to FIG. 1, this design contains a variety of advantageous features. The use of loop antennas 14$a$, 14$b$, 14$c$ helps to reduce the specific absorption rate (SAR) of the mobile wireless communications device 10 in use. The size and shape of these antenna loops 14$a$, 14$b$, 14$c$ can be selected based upon the desired frequencies of operation of the mobile wireless communications device 10, such that they resonate as desired.

In addition, the reconfigurability of the reconfigurable antenna 11 provides frequency, pattern, and polarization reconfigurability. The resonance frequency of the reconfigurable antenna 11 can therefore be tuned by reconfiguration via the processor 20.

With reference to flowchart 30 of FIG. 4, a method of making the mobile wireless communications device is now described. After the start (Block 32), a reconfigurable antenna is formed. Forming the reconfigurable antenna also includes forming a plurality of electrical conductors on a dielectric substrate arranged in a series of spaced apart antenna loops with each successive outer antenna loop surrounding an adjacent inner loop, each antenna loop having a pair of endpoints (Block 346). Forming the reconfigurable antenna further includes associating a plurality of switches with respective endpoints of the antenna loops (Block 38). Then, a processor is adapted to reconfigure the reconfigurable antenna and to couple a wireless transceiver thereto via the plurality of switches, at Block 40. Block 42 indicates the end of the method.

Example components of a mobile wireless communications device 1000 that may be used in accordance with the above-described embodiments are further described below with reference to FIG. 17. The device 1000 illustratively includes a housing 1200, a keyboard or keypad 1400 and an output device 1600. The output device shown is a display 1600, which may comprise a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 17:
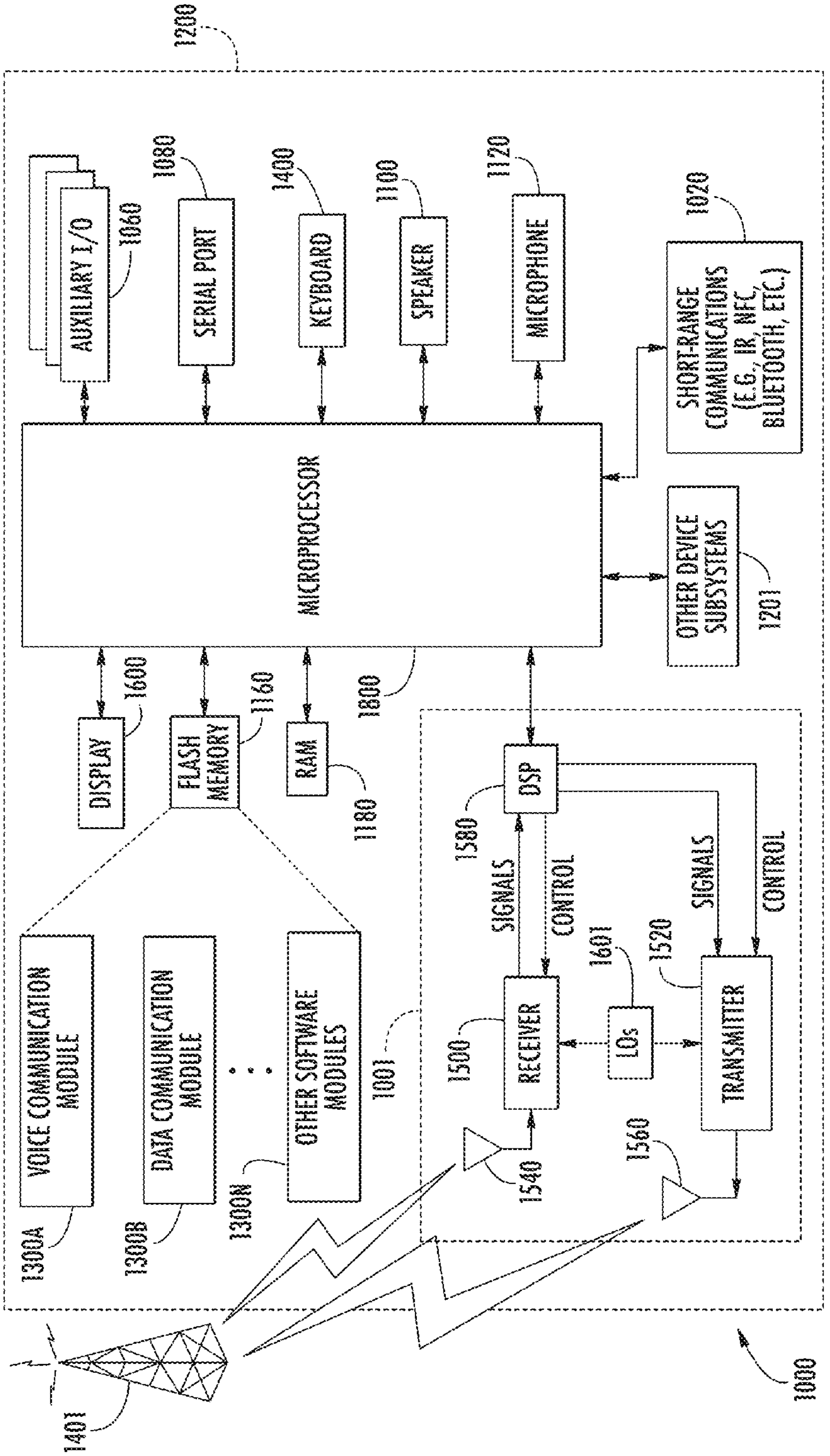
FIG. 17 is a schematic block diagram illustrating example components of a mobile wireless communications device that may include the reconfigurable antenna in FIGS. 1-3.

In addition to the processing device 1800, other parts of the mobile device 1000 are shown schematically in FIG. 17. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The invention claimed is:

1. A mobile wireless communications device comprising:

a wireless transceiver;

a reconfigurable antenna coupled to said wireless transceiver and comprising a dielectric substrate, a plurality of electrical conductors on said dielectric substrate and arranged in a series of spaced apart, nested antenna loops with each successive outer antenna loop surrounding an adjacent inner loop, each antenna loop having a pair of endpoints, and a plurality of switches, wherein each endpoint of the pair of endpoints of each antenna loop of the antenna loops has a corresponding switch of the plurality of switches, wherein a number of the plurality of switches equals a number of the endpoints of the antenna loops, wherein the plurality of switches are adapted to selectively couple at least two loops to each other; and a processor adapted to reconfigure said reconfigurable antenna and couple said wireless transceiver thereto via said plurality of switches.

2. The mobile wireless communications device of claim 1, wherein said reconfigurable antenna further comprises an electrically conductive layer on said dielectric substrate defining a ground plane; and wherein said plurality of electrical conductors are laterally adjacent the ground plane, wherein first switches of the plurality of switches of first endpoints of each antenna loop enable selective connection with the ground plane, and wherein second switches of the plurality of switches of second endpoints of each antenna loop enable selective connective with the wireless transceiver.

3. The mobile wireless communications device of claim 2, wherein said processor is adapted to reconfigure said reconfigurable antenna into a monopole mode by causing said plurality of switches to couple at least one of the antenna loops to said wireless transceiver and not to the ground plane.

4. The mobile wireless communications device of claim 1, further comprising a printed circuit board having an electrically conductive layer thereon defining a ground plane; and wherein said processor is adapted to reconfigure said reconfigurable antenna and couple said wireless transceiver and the ground plane thereto via said plurality of switches.

5. The mobile wireless communications device of claim 4, wherein said processor is adapted to reconfigure said reconfigurable antenna into a monopole mode by causing said plurality of switches to couple at least one of the antenna loops to said wireless transceiver and not to the ground plane.

6. The mobile wireless communications device of claim 1, wherein said plurality of switches comprises a respective feed switch coupled to a respective endpoint of each antenna loop, and wherein the antenna loops have shapes selected from a group consisting of spirals, curves and meanders.

7. The mobile wireless communications device of claim 1, wherein said plurality of switches comprises a respective ground switch coupled to a respective endpoint of each antenna loop, and wherein a first length of an inner antenna loop of the series of spaced apart, nested antenna loops is greater than a second length of an outer antenna loop of the series of spaced apart, nested antenna loops.

8. The mobile wireless communications device of claim 1, wherein said processor is adapted to reconfigure said reconfigurable antenna by coupling at least two antenna loops to each other and to said wireless transceiver in one of a series or a parallel arrangement.

9. The mobile wireless communications device of claim 1, wherein said processor is adapted to reconfigure said reconfigurable antenna by causing said plurality of switches to couple a selected one of the antenna loops to said wireless transceiver.

10. The mobile wireless communications device of claim 1, wherein said processor is adapted to reconfigure said reconfigurable antenna by causing said plurality of switches to couple at least one of the antenna loops to said wireless transceiver and not to a ground plane.

11. The mobile wireless communications device of claim 1, wherein said antenna loops are equally spaced apart from each other.

12. The mobile wireless communications device of claim 1, wherein said antenna loops share a common axis.

13. The mobile wireless communications device of claim 1, wherein each of said antenna loops has a rectangular shape.

14. The mobile wireless communications device of claim 1, wherein at least one of said antenna loops has a rectangular shape with at least one electrically conductive path extending between a pair of transverse sides thereof.

15. The mobile wireless communications device of claim 1, wherein said antenna loops are at least three in number.

16. The mobile wireless communications device of claim 1, wherein each successive outer antenna loop has a greater length than an adjacent inner loop.

17. A mobile wireless communications device comprising:

a wireless transceiver;

a reconfigurable antenna coupled to said wireless transceiver and comprising a dielectric substrate, an electrically conductive layer on said dielectric substrate defining a ground plane, a plurality of electrical conductors on said dielectric substrate laterally adjacent said ground plane and arranged into at least three spaced apart antenna loops with each successive outer antenna loop surrounding an adjacent inner loop, each successive outer antenna loop having a greater length than an adjacent inner loop, and each antenna loop having a pair of endpoints, and a plurality of switches, wherein each endpoint of the pair of endpoints of each antenna loop of the antenna loops has a corresponding switch of the plurality of switches, wherein a number of the plurality of switches equals a number of the endpoints of the antenna loops, wherein the plurality of switches are adapted to selectively couple at least two loops to each other; and a processor adapted to reconfigure said reconfigurable antenna and couple said wireless transceiver thereto via said plurality of switches.

18. The mobile wireless communications device of claim 17, wherein said processor is adapted to reconfigure said reconfigurable antenna by coupling at least two antenna loops to each other and to said wireless transceiver.

19. The mobile wireless communications device of claim 17, wherein said processor is adapted to reconfigure said reconfigurable antenna by causing said plurality of switches to couple a selected one of the antenna loops to said wireless transceiver.

20. The mobile wireless communications device of claim 17, wherein said antenna loops are equally spaced apart from each other, and wherein the at least two loops are selectively coupled in one of a series or a parallel arrangement.

21. A method of making a mobile wireless communications device with a reconfigurable antenna comprising:

forming the reconfigurable antenna by forming a plurality of electrical conductors on a dielectric substrate arranged in a series of spaced apart antenna loops with each successive outer antenna loop surrounding an adjacent inner loop, each antenna loop having a pair of endpoints, associating a plurality of switches with respective endpoints of the antenna loops, wherein a number of the plurality of switches equals a number of the endpoints of the antenna loops, and wherein the plurality of switches are adapted to selectively couple at least two loops to each other; and adapting a processor to reconfigure the reconfigurable antenna and to couple a wireless transceiver thereto via the plurality of switches.

22. The method of claim 21, wherein the reconfigurable antenna is reconfigured by the processor by coupling at least two antenna loops to each other and to the wireless transceiver, wherein the plurality of switches comprises a group of first switches and a group of second switches, wherein each of the group of first switches is selectively connected with a ground plane, wherein each of the group of second switches is selectively connected with a ground plane, and a number of group of second switches equals a number of the group of first switches.

23. The method claim 21, wherein the reconfigurable antenna is reconfigured by the processor by causing the plurality of switches to couple a selected one of the antenna loops to the wireless transceiver.

* * * * *

UNITED STATES PATENT AND TRADEMARK OFFICE

CERTIFICATE OF CORRECTION

PATENT NO. : 9,263,788 B2
APPLICATION NO. : 13/227968
DATED : February 16, 2016
INVENTOR(S) : Ayatollahi It is certified that error appears in the above-identified patent and that said Letters Patent is hereby corrected as shown below:

In the claims

Column 9, line 22, claim 2 delete “connective” insert --connection--

Signed and Sealed this
Nineteenth Day of April, 2016

Michelle K. Lee
*Director of the United States Patent and Trademark Office*